Patented Nov. 11, 1952

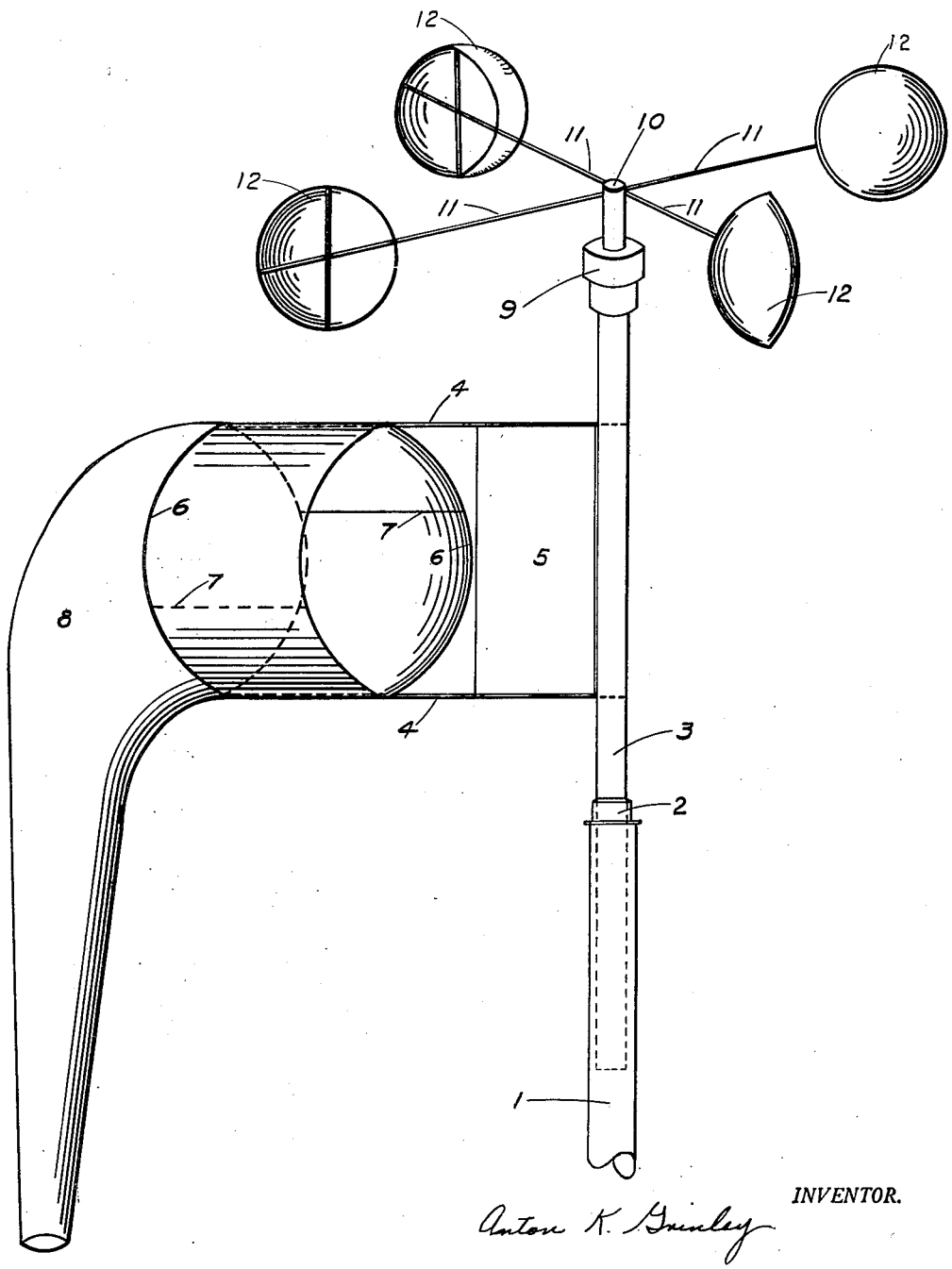

2,617,298

UNITED STATES PATENT OFFICE 2,617,298

MINIATURE COMBINATION WIND SOCK AND ANEMOMETER

Anton K. Grinley, St. Paul, Minn.

Application April 22, 1950, Serial No. 157,427

1 Claim. (Cl. 73—189)

This invention is a device which consists of a wind sock constructed on a miniature scale, combined with an anemometer, also constructed on a miniature scale, which together form a device which will indicate both the direction and velocity of the wind. The direction of the wind is indicated by the opening of the wind sock swinging into the wind and the velocity of the wind is indicated by the speed of rotation of the anemometer.

The device is illustrated in the accompanying drawing, to which the numbers refer, and which is more specifically described as follows:

The base consists of a pipe 1 which supports the device and is used to attach the device to a building, pole or other structure. Above the base pipe is a pipe which supports the wind sock 3. This pipe is fitted inside of the base pipe in such a manner as to permit free rotation. Around the outside of pipe 3 is attached a washer 2 which provides the support and surface by which pipe 3 rotates inside of and above pipe 1. Through pipe 3 are drilled two holes into which are fitted the rods which support the wind sock. These two rods 4 extend at right angles from pipe 3. These rods are attached to pipe 3 in any convenient manner. As shown in the drawing these rods are fitted into appropriate sized holes drilled in pipe 3. To these two rods are attached two rings 6, one attached at the end of the rods and the other three inches inside of the outer ring. Two brace rods 7 are attached to the rings to give greater strength. Over the outside of the two rings 6 is slipped a wind sock 8 which is attached to the inner ring. The wind sock is round and tapers to a small opening of one and one half inches. Between rods 4 and adjacent to pipe 3 is attached a plate which acts as a wind vane 5.

To the top of pipe 3 is attached a ball bearing 9. The bearing is attached to pipe 3 at its outer race. To the inner race of the bearing is attached pipe 10 which supports the anemometer. Through the top of this pipe are drilled two holes at right angles to each other. Through these holes are inserted two rods 11, extending an equal distance to each side of the pipe. To the ends of each of these rods is attached a round cup or hemisphere 12. The reciprocal cups are faced in opposite directions. The cups are attached to the rods by drilling two holes near each edge and inserting the rods through these holes and securing them.

The device as above constructed enables the unit consisting of the wind sock to swing freely on the base pipe and likewise enables the unit consisting of the anemometer to rotate freely on the bearing, each independent of the other.

The device as illustrated in the drawing is approximately one half actual size. This will produce a workable device of correct proportions. However, the size of each component part can be varied proportionately to produce a larger or smaller model. It is my intention, however, that this device shall be a miniature as compared to conventional wind socks now in use on airports.

All materials used in this device are non-rusting metals or plastic and the wind sock is of durable non-fading fabric. It is intended that this device shall be used to observe the action of the wind from the ground rather than from the air and that it may be used as an advertising medium by the use of lettering on the wind sock.

I am aware that conventional wind socks of various types and designs are used as wind direction indicators on airports; I am also aware that anemometers of various types and designs are used to measure wind velocity. However, to my knowledge and belief, the wind sock and the anemometer have not been combined in one device, nor has a combination wind sock and anemometer been made or used on a miniature scale; nor has such a miniature combination wind sock and anemometer been made or used in the manner described in this specification.

I, therefore, claim the invention of a device which is:

A miniature windsock for use in connection with an anemometer, comprising a tapered elongated sleeve of flexible material, a supporting frame consisting of two spaced rings, braced at the horizontal diametric centers thereof by two rods, the larger inner opening of the windsock being fitted over and secured to the inner ring of the supporting frame, a vertically disposed rotatable pipe, two parallel rods, one end of each being secured to the vertical diametric centers of the two rings and the other end of each being secured to the vertically disposed rotatable pipe, a narrow plate or vane attached between the two parallel rods adjacent to the rotatable pipe, a vertical base or supporting pipe, the lower end of the rotatable pipe being fitted within the top end of the base pipe in such a manner as to permit free rotation and being supported thereon by means of a collar or washer secured to the rotatable pipe.

ANTON K. GRINLEY.

REFERENCES CITED

The following references are of record in the file of this patent:

UNITED STATES PATENTS

| Number | Name | Date |
|---|---|---|
| 923,185 | Jurgensen | June 1, 1909 |
| 1,475,075 | Macy | Nov. 20, 1923 |
| 1,736,109 | Barton | Nov. 19, 1929 |